US005593128A

United States Patent [19]
Odom et al.

[11] Patent Number: 5,593,128
[45] Date of Patent: Jan. 14, 1997

[54] LAP SUPPORTED COMPUTER MOUSE SURFACE

[76] Inventors: Patricia B. Odom; Harold A. Odom, Jr., both of P.O. Box 697, Missouri City, Tex. 77549-0697

[21] Appl. No.: 389,497

[22] Filed: Feb. 16, 1995

[51] Int. Cl.⁶ .................................................. A47B 91/00
[52] U.S. Cl. ..................................... 248/346.01; 248/918
[58] Field of Search .................... 248/346.01, 346.05, 248/346.07, 346.2, 346.5, 918, 118, 118.3, 51, 448; 108/43

[56]  References Cited

U.S. PATENT DOCUMENTS

| | | | |
|---|---|---|---|
| 2,144,272 | 1/1939 | Ray | 248/51 |
| 2,549,717 | 4/1951 | Snodgrass | 248/51 |
| 3,094,258 | 6/1963 | Punke | 248/346.07 X |
| 4,103,809 | 8/1978 | Frost et al. | 108/43 X |
| 4,518,164 | 5/1985 | Hayford et al. | 108/43 X |
| 5,106,156 | 4/1992 | Marquis | 108/43 X |
| 5,203,845 | 4/1993 | Moore | 248/918 X |
| 5,263,423 | 11/1993 | Anderson | 108/43 |
| 5,340,075 | 8/1994 | Schriner | 248/118 X |
| 5,355,811 | 10/1994 | Brewer | 108/43 |

Primary Examiner—Ramon O. Ramirez

[57] ABSTRACT

A work surface for operating a computer cursor control device in the lap or on the thigh of a computer user while the hands and arms are in a natural resting position while seated, thereby reducing the injuries and fatigue associated with operating a computer cursor control device on a desktop with the hands and arms extended. The work surface has a retaining wall partially around the perimeter which keeps the mouse from rolling off the operating surface when the mouse is left unattended. The telemetry cord of the computer cursor control device is captured in a clip or opening to define the length of cord necessary to operate the mouse and keep the cord from accidentally dragging the mouse from the work surface. The work surface may be positioned on the either thigh or across the lap and retained by adjustable locating means.

19 Claims, 4 Drawing Sheets

LAP SUPPORTED COMPUTER MOUSE SURFACE

BACKGROUND AND SUMMARY OF THE INVENTION

This invention relates to a work surface for use of a computer mouse, computer trackball and other computer signalling devices which allows the user of the mouse and other devices and the invention to operate them upon a surface located on either thigh or in the lap and either from a right handed perspective or a left handed perspective.

Computers and the attendant operating systems and applications software which causes them to be used by an increasingly large number of person have given rise to an increased necessity of the usage of computer signalling devices called a computer mouse or computer trackball, all well known to both those skilled in the art and to the general public. The signalling device is used to locate a cursor on the visual monitor of the computer system and through communication by depressing or "clicking" buttons transmits signals to the computer to bring about desired responses from the computers software.

The use of the mouse and other computer signalling devices traditionally has been at the side of the keyboard on the desk or table top which supported the keyboard and computer. This placement requires that the user reach outward to the right or left of the keyboard to control and activate the signalling device. As software has become more signalling device instruction intensive, the user is exposed to longer periods of reaching and operating the mouse and other signalling devices from this unnatural position exposing the user to a number of physical problems including carpal tunnel syndrome, repetitive motion injury and lower back injury and the mental problems associated with occupational related stress.

The present invention provides an operating surface for a computer signalling device. The invention is easily and temporarily mounted in the lap for either right hand use or left hand use of the computer signalling device upon the operating surface of the invention.

The underside of the invention has an adjustable thigh engaging or locating system to retain the device and the computer signalling device where placed whenever the user needs to move the hands away from the mouse temporarily and the topside has a retaining system to keep the mouse from rolling off the operating surface when not held by the users hand.

The present invention is highly desirable for use by persons who are not able to get to a desk in a normal sitting capacity, such as handicapped or bedridden person who would desire to use a computer featuring software which requires a computer signalling device.

Various prior art inventions of interest are as follows:

U.S. Pat. No. 5,355,811 to Brewer. This device is an adjustable leg supported mouse pad which requires a person using it to press a saddle like structure against the thigh and then to position a pillow like wedge against the both top sides of the saddle like structure and then attach a mouse pad so that both outer ends of the mouse pad are supported by the pillow like support members. This method of necessity requires that female users either wear pants, shorts, loose fitting dresses, or raise their skirts to an embarrassing level to properly engage the thigh with the Brewer device. The Brewer device must be adjusted to fit the thigh at one point and if a person desires to move the mouse pad to a different location on the thigh for more comfortable operation they must remove the pad and repeat the saddle alignment procedure. The Brewer device does not provide for a method of adjusting and retaining the mouse cord so that only enough of the mouse cord to navigate the operating surface is free to travel with the mouse while being operated upon the mouse pad surface. The absence of this feature allows the mouse to be pulled from the mouse pad by the weight of the cord, or movement of the operator and chair in the work area even if a raised peripheral edge is employed. A raised peripheral edge as taught in Brewer does not provide an entry point for a natural transition for the hand and wrist onto the mouse pad so that the resting position of the wrist and hand when on the thigh can be continued when using a mouse on the mouse pad preventing exposure to injuries such as carpal tunnel syndrome.

U.S. Pat. No. 5,203,845. This device is a mouse pad with an elevated portion at the point where the wrist can rest while using a mouse on the device and has a compound angled surface for the mouse to operate upon while on a flat surface such as a desk top.

U.S. Pat. No. 5,340,075. This device is an ergonomic mouse pad which is sloped and designed to facilitate wrist comfort of the user. This invention is usable in conjunction with a surface such as a desk top or table top.

Other related art is disclosed in U.S. Pat. Nos. 5,050,826, 4,482,063, 4,481,556, 4,545,554, 4,621,781 which along with 5,340,075, 5,203,845 and 5,355,811 as referenced above, are hereby fully incorporated by reference for all they disclose.

SUMMARY OF THE INVENTION

Figure 1:
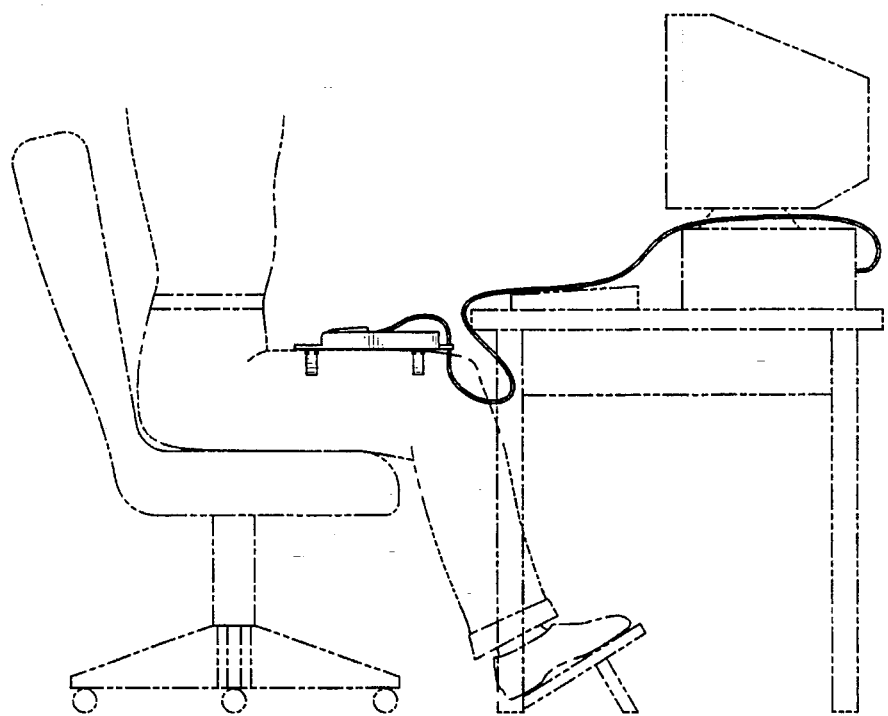
FIG. 1 A side view of a person seated using the present invention.

The focus of the present invention is to provide a new and improved operating surface and retention system which is remote from a desk top for a computer mouse and other computer signalling devices.

The invention will be discussed from the perspective of a lap or thigh mounted work surface and/or holder for a working surface for a computer mouse which comprises: a platform whose topside is generally planar providing a working surface; an outermost edge of the working surface which turns upward from the platform to form a retaining wall or lip beginning at a point near the lower left hand corner of the invention when viewed in plan view, and continuing around the invention and terminating near the lower right hand corner. The invention may further comprise a detachable underside portion which has adjustable means for engaging portions of both sides of the leg between the knee and hip; and cord handling means such as one or more clips or equivalents to engage and secure a portion of a computer mouse cable.

In one embodiment of the invention the working surface is sized such that the underside of the working surface is capable of being placed in the lap at differing angles and attitudes. Additionally, the lap mounted embodiment presents a low profile surface that minimizes interference of the mouse and the invention with a desk or table top when it is desirable to access the keyboard of the computer situated thereon. The lap mounted embodiment is of particular benefit to users such as bedridden or handicapped individuals, and young children who have difficulty getting comfortable access to a desktop surface. The underside of the invention in this embodiment further comprises extensions of location means and/or the platform extendable to the right, to the left, or to the left and right simultaneously to adapt to laps of differing widths and to aid in the positioning of the working surface at the desired position across the lap for either right handed or left handed users.

In an alternate embodiment of the invention the weighted bags of the invention engage and adjust to a thigh and any clothing between the thigh and the invention in such a manner that the flat surface of the device remains in a relatively fixed position during operation of the mouse and remains so even when the hand is temporarily removed from the mouse. The lap mounted and the weighted bag engagement methods are particularly beneficial for users who wear dresses and skirts while using the invention. The adjustable engagement methods are designed to accommodate a wide range of sizes and shapes of legs between the knees and hips.

A prime advantage of the present invention is the ability of the user to operate a mouse or computer track ball on the invention while seated in a position which encourages proper seated posture minimizing the fatigue and possible injury to shoulders, wrists, arms and backs associated with reaching for and using a mouse located on a desktop or table top.

A further advantage of all embodiments of the present invention is the provision of retaining clips or appropriately sized openings at points around the perimeter of the invention to engage and hold the cord of the computer signalling device thereby defining the length of mouse cord needed to navigate the surface of the invention and to limit the amount of free travel of the mouse when a hand is not on the mouse. Additionally the invention has a retaining wall or lip or alternatively, a series of retaining posts spaced sufficiently apart from each other to keep a computer mouse from robing between any two posts, at the outer edges of the operating surface to keep the mouse from rolling off the edges of the invention when the hands are temporarily removed from the mouse.

A further advantage of all embodiments of the present invention is the ability to replace the surface upon which the mouse can operate. The surface of the invention is appropriately textured to promote smooth operation of the roller ball of a mouse, yet the area between the retaining walls can be fitted with a wide variety of commercially available mouse pads which can be inexpensively obtained in all shapes and sizes to change out a worn or soiled mouse pad thereby promoting longer mouse life.

A further advantage of all embodiments of the present invention is the ability to control the mouse cord by keeping the cord in the mouse cord clip when storing and retrieving the mouse and the invention thereby minimizing the steps necessary to use and discontinue use of the mouse and the invention.

A further advantage of all embodiments of the present invention is that the use by female users does not require that they wear slacks or shorts in order to use the invention without raising the dress or skirt to prop the invention on the thigh or in the lap.

A further advantage of the present invention is that a mouse pad with an ergonomic padded wrist elevating portion can be used with the invention.

A further advantage of the present invention is that the working surface can be raised or lowered in the front or back to give an angle of operation which allows the user to position the wrist nearly in a straight position.

In this respect the apparatus as shown in FIG. 1 illustrates the use of a computer mouse 2 in the invention 1 on the thigh 3 of a person seated in a chair 4. Since the device can be rotated variously as most convenient, for left and right handed users, reference to left, right and top (or forward) and rearward edges of the invention are related to the invention itself and not the users left or right.

Figure 2:
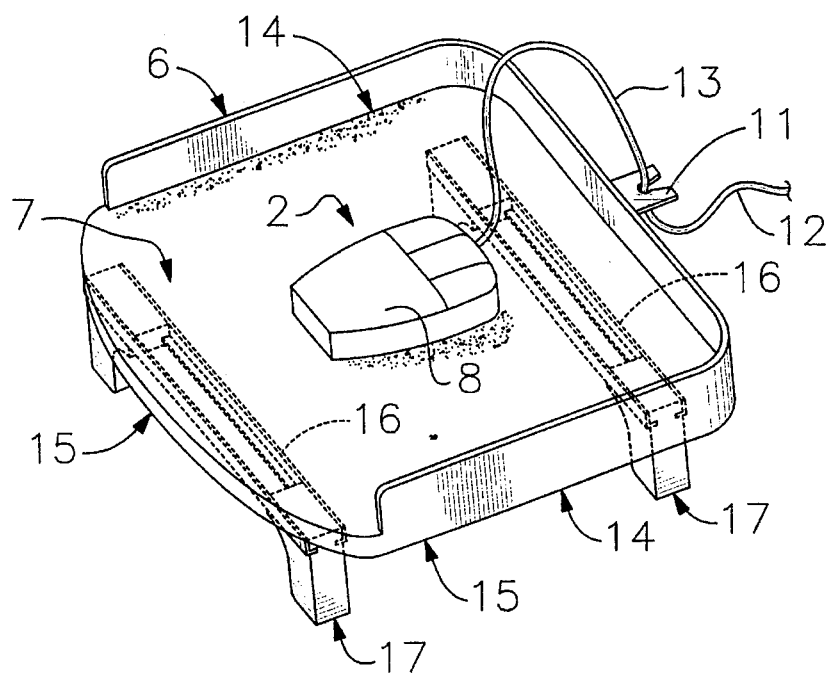
FIG. 2 A perspective view of an embodiment of the invention with a computer mouse attached.
Figure 6A:
FIG. 6a A cross section of a typical mouse pad.
Figure 6B:
FIG. 6b A cross section of a typical mouse pad.

FIG. 2 shows the present invention 1 made from a thermoplastic molding process which includes a relatively flat ¼" thick platform 5 which is generally rectangular in shape having a forward edge 13, a pair of side edges 14, and a rear edge 15. One side of the platform 5 has a generally planar working surface 7 intended to be facing upward to operate a computer mouse 2 upon. The working surface 7 is smooth or of a fine texture to promote a smooth rolling of the computer mouse tracking ball 8 or can be fitted with a commonly available mouse pad 9, 10 as shown in FIG. 6 (both FIGS. 6a and 6b). A retaining wall or lip 6 is attached to or molded as part of the platform 5 around both side edges 14 and the forward edge 13 and is provided in part to keep the computer mouse 2 from rolling off the platform 5 when the person operating the computer mouse 2 takes his or her hand off the computer mouse 2. The lip can be continuous as illustrated or segmented into portions, so long as openings between segments are not large enough to permit the mouse to escape.

Mouse cable retaining means may be provided also to further secure a mouse to the invention and to help orient the mouse and manage the cable length optimally. FIG. 2 shows a clip 11 for engaging the cable 12 of a computer mouse 2 or computer trackball 2a so that the cable 12 can be retained in the clip 11 at the desired length to allow operation of the computer mouse 2 or computer trackball 2a in full range upon the working surface 7 and to keep the cable 12 from becoming accidentally disengaged from the invention 1. Alternatively one or more openings or holes 25 in retaining wall 6 can be provided to secure the cable length desired to the invention at the optimum location.

Figure 8:
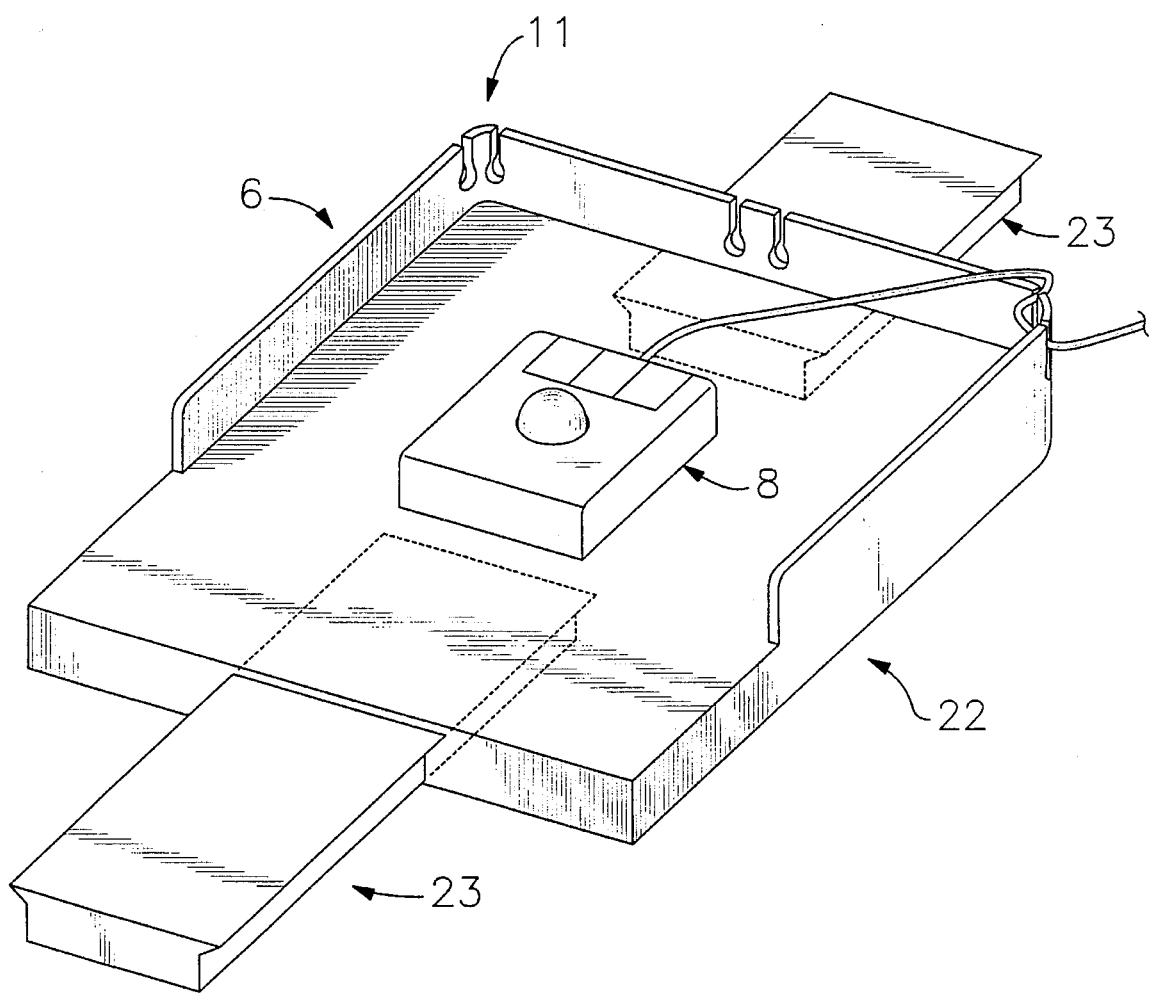
FIG. 8 A perspective view of an embodiment of the lap mounted invention with platform extensions.

In the embodiment of the invention as shown in FIG. 8 the operating surface 24 has a length of approximately 12" and a width of approximately 9". A retaining wall 6 extending above the operating surface 7 for a height of ½" around all of it's perimeter except the end where there is no clip 11 and 4" of each side adjacent to that end. The underside of the operating surface 22 may be fitted with two platform extensions 23 which slide outward to the right and the left to provide a wider platform if desired and to allow the user to slide the operating surface 22 across the lap to a position which is most desirable for the user and still keep the operating surface 22 or any platform extensions 23 in contact with both thighs. For right handed users the invention as shown in FIG. 8 has the top or forward edge of the operating surface 22 which has the clip 11 present on the users left. For left handed users the invention as shown in FIG. 8 would have the top or forward edge of the operating surface 22 which has the clip 11 present on the users right.

Figure 7:
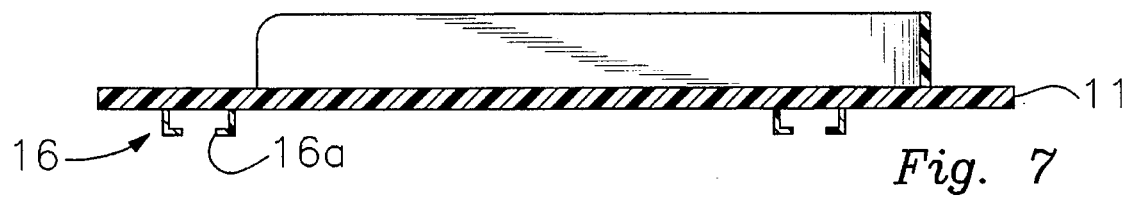
FIG. 7 A cross section of an embodiment of the invention using track mounted stabilizers as a thigh engaging means.
Figure 7A:
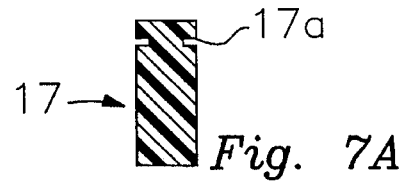
FIG. 7a A frontal cross section of a stabilizer.
Figure 7B:
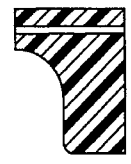
FIG. 7b A side cross section of a stabilizer.

In the embodiment of the invention as shown in FIGS. 2 & 7, the underside of the platform 5 has attached to or molded as a part thereof a pair of tracks 16 designed to receive two stabilizing braces 17 into each end of the track 16 in a manner which allow each stabilizing brace to be positioned along the track 16 and be retained by friction in the desired position thereby forming an inverted saddle for keeping the invention propped against the thigh and/or knee as desired.

Figure 3:
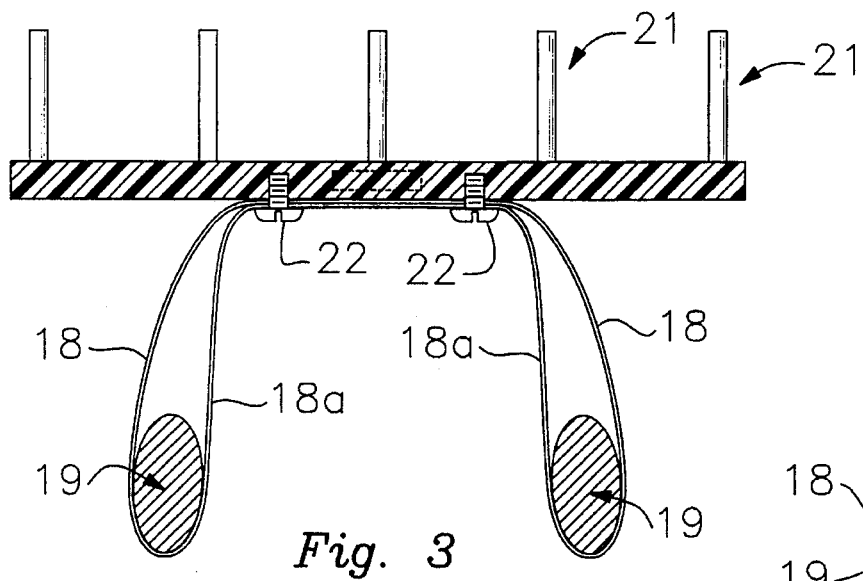
FIG. 3 A frontal cross section of an embodiment of the invention using weighted bags as a thigh engaging means.
Figure 3A:
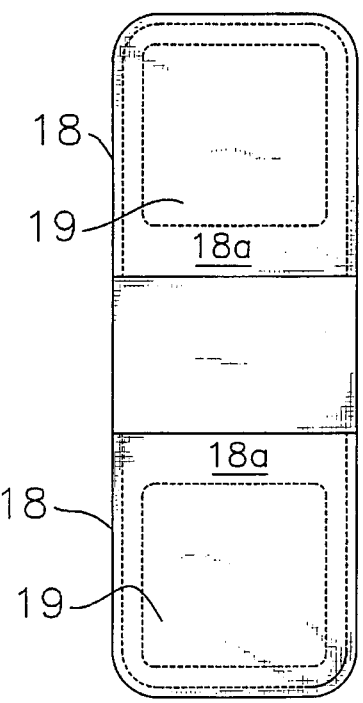
FIG. 3a A bottom view of the weighted bags as used with the invention in FIG. 3.
Figure 4:
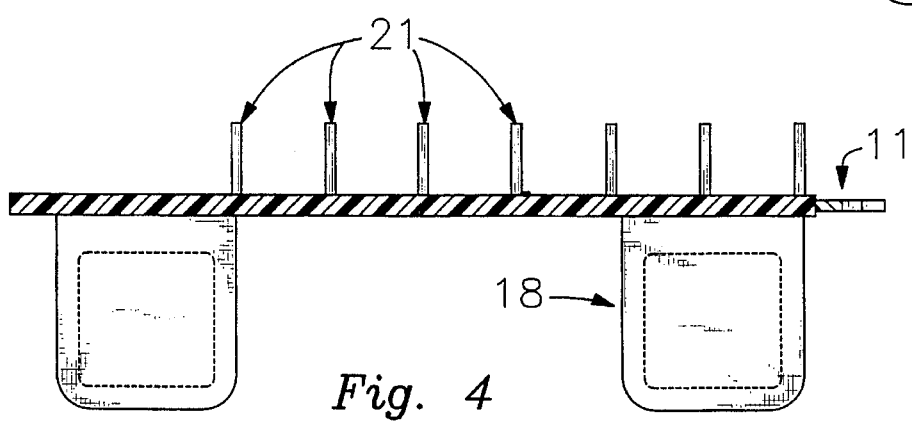
FIG. 4 A side cross section of an embodiment of the invention using weighted bags as a thigh engaging means.
Figure 5:
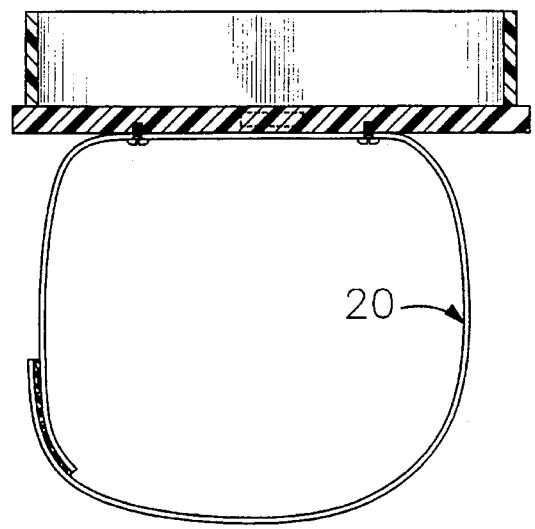
FIG. 5 A frontal cross section of an embodiment of the invention using belting as a thigh engaging means.

FIGS. 3, 3a & 4 shows an alternate method of supporting and stabilizing the invention 2 on the leg by the use of one or more sets of connected flexible pouches 18 with a weighted material such as sand enclosed and retained inside each flexible pouch 18 as a counterweight and attached to the underside of the platform by pop rivets 22 or Velcro® fasteners. FIG. 3a illustrates in plan view from the bottom a set of the pouches unattached from the platform and spread open. When the invention 2 is configured with a set or sets of weighted pouches, it is positioned on the leg of the person so that the attached flexible pouches 18 rest on each side of the leg in the manner of saddle bags and props the invention 1 in the desired position for operation. The flexible pouches 18 of FIG. 3 and FIG. 4 are of a vinyl material and the portion of the pouch 18a which is nearest each leg is of a material and texture such as rubber to increase the stabilizing characteristics of the pouch 18.

An alternate method of propping the invention on the leg by the use of a belt 20 which can be elastic and use a buckle as a fastener or can be held in place with a Velcro® fastener. The invention can alternatively be supported and stabilized on the lap of a user by sizing and configuring the dimensions of the lower surface of the platform to span across the lap of a user but to fit within arms of a desk chair. This alternative can further be provided with any of a variety of known texturing treatments, for the lower surface to enhance the tendency of the lap supported platform to remain place.

FIG. 4 shows ¼" diameter studs 21 attached or molded at 2" intervals around the perimeter of the side edges 14 and forward edge 13 of the working surface 7 for a height of ½" each to keep the computer mouse 2 from rolling off the platform 5 when a person takes his or her hand off the computer mouse 2.

The present invention anticipates that the optimum angle of the wrist to the working surface 7 will be achieved due to the propping of the invention 1 on a leg or lap where the wrist rests in a natural manner against the thigh however a change in the angle of the working surface 7 can be achieved by use of a variety of mouse pads as shown in FIG. 6 with a raised wrist rest or an angled and beveled surfaces.

All embodiments of the present invention provide for user selected placement of a computer trackball 2a on the operating surface 22 with adhesive backed Velcro® fasteners on the operating surface 22 and the computer trackball 2a. Moving the adhesive backed Velcro® to a differing position on the operating surface 22 allows for optimum placement of the trackball 2a.

As to the manner of operation and use of the present invention, the same is made apparent from the foregoing discussion. With respect to the above description, it is to be realized that although dimensional embodiments of specific material is disclosed, those enabling embodiments are illustrative, and the optimum dimension relationships for the parts of the invention are to include variations in size, material, shape, form, function and manner of operation, assembly and use, which are deemed readily apparent to one skilled in the art in view of this disclosure, and all equivalent relationships to those illustrated in the drawings and encompassed in the specifications are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention.

What is claimed as being new and desired to be protected by letters patent is as follows:

1. A remote work surface for a computer cursor control device, comprising platform means for providing an area for seating a computer cursor control device; locating means for positioning and securing the surface; and retaining means for constraining movement of the computer cursor control device, wherein said platform means further comprises a left side edge, a right side edge and a rear edge and wherein said retaining means for constraining movement of the computer cursor control device further comprises post means spaced apart in series and upwardly extending from said platform means adjacent said left side edge, right side edge and rear edge for preventing said computer cursor control device from escaping said surface of said seating area.

2. The invention of claim 1 wherein said left side edge, a right side edge and a rear edge are rectilinear.

3. The invention of claim 1 wherein said platform means further comprises a planar top surface.

4. The invention of claim 1 wherein said platform means further comprises surface texture means for enhancing the use of a computer mouse computer cursor control device.

5. The invention of claim 1 wherein said platform means further comprises a lower surface and said locating means further comprises inverted saddle means on said lower surface for positioning said platform means in the lap of a computer user.

6. The invention of claim 5 wherein said lower surface locating means further comprises extension means for increasing the operable width of said inverted saddle means.

7. The invention of claim 1 wherein said platform means further comprises a lower surface and said locating means further comprises weighted saddle bag means on said lower surface for positioning said platform means in the lap of a computer user.

8. The invention of claim 1 wherein said platform means further comprises a lower surface and said locating means further comprises weighted saddle bag means on said lower surface for positioning said platform means on the thigh of a seated computer user.

9. The invention of claim 1 wherein said platform means further comprises a lower surface and said locating means further comprises track means on said lower surface for carrying width adjustable stabilizing brace means for positioning said platform means in the lap of a computer user.

10. The invention of claim 1 wherein said platform means further comprises a lower surface and said locating means further comprises adjustable belt means on said lower surface for positioning and securing said platform means at a location remote from a computer workstation desktop.

11. The invention of claim 1 wherein said platform means further comprises extension means for increasing the surface area of said computer cursor control device seating area.

12. The invention of claim 1 wherein wherein said retaining means for constraining movement of the computer cursor control device further comprises lip means upwardly extending from said platform means adjacent said left side edge, right side edge and rear edge for preventing said computer cursor control device from escaping said surface of said seating area.

13. The invention of claim 12 wherein said retaining means further comprises cord clip means for orienting the telemetry cord of a computer cursor control device and for limiting the free length of said cord usable on said platform seating area surface.

14. The invention of claim 12 wherein said retaining means further comprises cord holding means for orienting the telemetry cord of a computer cursor control device and for limiting the free length of said cord usable on said platform seating area surface.

15. The invention of claim 14 wherein said cord control means comprises at least one opening in said lip means through which said cord is threaded.

16. The invention of claim 1 wherein said platform means further comprises a lower surface and said locating means further comprises inverted saddle means on said lower surface for positioning said platform means on the thigh of a seated computer user.

17. The invention of claim 1 wherein said locating means further comprises a lower surface means on said platform means.

18. The invention of claim 17 wherein said lower surface locating means further comprises extension means for increasing the operable width of said locating means.

19. A remote work surface for a computer cursor control device, comprising:

a) platform means with a planar top surface and a left side edge, a right side edge and a rear edge for providing an area for seating a computer cursor control device;

b) locating means for positioning and securing the surface; and c) retaining means for constraining movement of the computer cursor control device comprising lip means upwardly extending from said platform means adjacent said left side edge, right side edge and rear edge for preventing said computer cursor control device from escaping said surface of said seating area and further comprising post means with cord clip means spaced apart in series and upwardly extending from said platform means adjacent said left side edge, right side edge and rear edge for orienting the telemetry cord of a computer cursor control device and for limiting the free length of said cord usable on said platform seating area surface.

* * * * *